March 10, 1953 C. E. BUSSERT Re. 23,625

IMMERSED FLORAL DISPLAY

Original Filed Feb. 19, 1952

Clarence E. Bussert
INVENTOR.

BY Donald H. Sweet
Atty.

Reissued Mar. 10, 1953 Re. 23,625

UNITED STATES PATENT OFFICE 23,625

IMMERSED FLORAL DISPLAY

Clarence E. Bussert, Melrose Park, Ill., assignor to Bowl-O-Beauty Co., Maywood, Ill., a corporation of Illinois Original No. 2,601,658, dated June 24, 1952, Serial No. 272,341, February 19, 1952. Application for reissue October 29, 1952, Serial No. 317,611

11 Claims. (Cl. 41—10)

Matter enclosed in heavy brackets [ ] appears in the original patent but forms no part of this reissue specification; matter printed in italics indicates the additions made by reissue.

For nearly half a century the art of making "water bouquets" has been practiced sporadically on a small scale. Such displays comprise an inverted glass container filled with water and flowers mounted in the container and immersed in the water. They last a few days or weeks before the decomposition of organic matter renders them unsightly and they are discarded or renewed.

The primary object of the invention is to prepare a display of a similar nature that will approximate the perfection of the original plant at the peak of its beauty, and remain unimpaired in condition and appearance indefinitely.

An advantage of the invention is that it is possible to employ a source material that would otherwise be thrown away and produce substantially permanent and exceptionally attractive immersed displays. The process of producing such a product involves but few steps, and is simple and quick.

Source material

Figure 1:
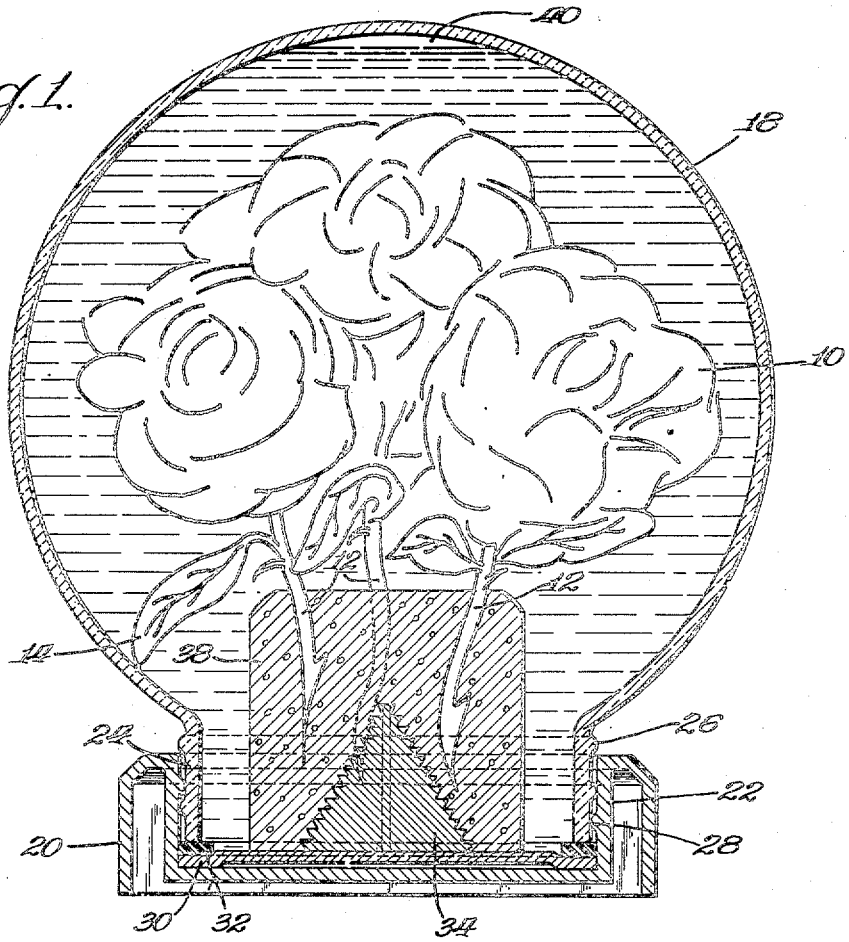
Figure 1 is a cross-section of a display according to the invention.
Figure 2:
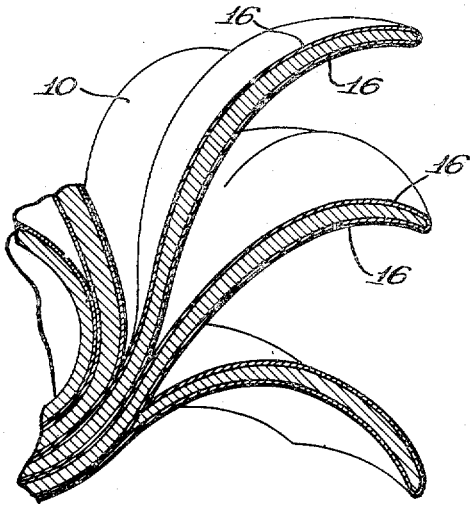
Figure 2 is a more or less diagrammatic section, on a greatly enlarged scale, of a portion of the blossom.

In proceeding according to the invention, I employ source material, selected from the class comprising bushes, trees, tubers, grasses, and fungi. Specific embodiments may include but are not limited to roses, carnations, nasturtiums, ears of green corn, tulips, blooming trees, including apple, pear, plum, dogwood, cherry, Japanese cherry, and Judas trees, May apples, trilliums, toadstools, mushrooms, and puffballs.

An outstanding advantage of the invention is that the source material can advantageously be processed at the time when its natural beauty is at its peak. In the case of floral displays this means that the source material is no longer salable in the ordinary channels of commerce through retail florists. This is because flowers retailed by florists must be in condition to reach their best appearance several hours or days after the customer has taken them home. If they were in the condition of best appearance when delivered to the florist, none of them would be "fresh" enough to be salable.

Integument

Source material of any of the types enumerated, having its full original natural shape and configuration, and usually its original natural color unimpaired, is procured in a clean and good-looking and dry condition and overcast with a substantially continuous and substantially impermeable and opaque integument. This seals the physical structure permanently with its original internal moisture content substantially intact and its original "raw" cell structure substantially unaltered by any material heating or cooking action. If the sealing process happens to involve a brief heating analogous to that required for pasteurizing milk, such heating does no harm at all, but experience seems to indicate that such is not essential.

Accordingly, an applying instrumentality is provided selected from the class comprising baths, flowing streams, pouring streams, and jets, said applying instrumentality consisting of material selected from the class of chemically inert opaque coating materials having melting points low enough not to injure or dehydrate the plant tissues.

Suitable integument materials may include Montan wax, Gersthofen wax, I. G. wax, carnauba wax, honeycomb, micro-crystalline petroleum wax, and white synthetic waxes such as amido esters, having the formula:

$$R—CO—NH—R'—O—CO—R$$

where R—CO is a fatty acid radical containing from 7 to 17 carbon atoms, and R' is an alkylene radical having from one to 6 carbon atoms; such as stearamide ethyl stearate $$CH_3—(CH_2)_{16}—CO—NH—(CH_2)_2—O—CO—(CH_2)_{16}CH_3$$

and bis (stearamide ethyl) adipate $$CH_3—(CH_2)_{16}—CO—NH—(CH_2)_4—O—CO—(CH_2)_{16}CH_3$$

and diamides having the formula $$R—CO—NH—R'—NH—CO—R$$

where R and R' are the same as in the amido esters abovementioned, such as methylene distearamide $$CH_3—(CH_2)_{16}—CO—NH—CH_2—NH—CO—(CH_2)_{16}—CH_3$$

Any of the above substances, when the pure substance has a melting point too high for the plant tissue, may be combined with diluents to reduce the melting temperature and to get an instrumentality that will not injure the plant. For instance, the micro-crystalline petroleum waxes are miscible in all proportions with ordinary mineral oil, and the resulting blend solidifies into a homogeneous and stable solid.

When using paraffin, it is possible to buy different kinds having melting points up to about 180 deg. F. or more and as low as 130 deg. F. In one illustrative example I have used two and one-half pounds of a paraffin certified to me to contain less than 1½% oil and moisture, which melts at from 130 deg. to 136 deg. This weight, when melted, has a volume of one quart. To this I add two quarts of a conventional water-white mineral oil having a viscosity of 95 to 100 Saybolt Universal, a color of 10 to 12 Saybolt Universal, and a minimum pour point of 30 deg. F., and secure a homogeneous blend with a slight tendency to form a skin when the mass is at 110 deg. F. and stands in air at room temperature. It can hardly be said to have a definite melting point, but solidifies gradually without segregation of its ingredients over a considerable range, from 110 deg. F. down to at least 100 deg. F. However, the thin coating formed on the finished display does not flow enough to spoil the display at temperatures as high as 105 deg. F.

At ordinary room temperatures, the coating 16 is effectively solid but rather flexible and tough, as compared with being brittle. It does not crack, even after prolonged water immersion.

After only a short period of practice, it is easy for an operator to coat and assemble such plants in any desired variety, and the coating 16 is thin enough so that the thickness of the original petal is not noticeably changed. An extremely lifelike appearance results, which is also permanent for a long period of time.

Color

The coloring medium may be selected from the class comprising pigments and dyes. For solid colors dyes are better but some plants have tiny color spots like stipoling and a stippled effect can be secured with pigment grains. Conventional oil-soluble dyes dissolve readily in the applying instrumentality, but careful selection is necessary to get a dye that is really permanent under exposure to light when embodied in an extremely thin integument layer and immersed in water, as hereinafter described. The integument may be made a close color match with the actual plant if desired, but a great advantage is that source material of the best shape and size can be selected, and finished in colors several shades darker or lighter than the original flowers. *Also, certain of the plant members may be covered with integument differing in color from that covering certain other members.* Where the final exposed color is a not unnatural one for the type of source material employed, the precise tint of the original becomes immaterial. More, where aesthetic aims are secured thereby, it is possible to present blue roses and other beautiful and attractive combinations unknown in nature.

As a specific instance, for the petals of a typical red rose, we employ as a red coloring dye, D & C #18 Red of the Calco Dye Company of Bound Brook, New Jersey. A four-quart batch of integument material needs about three grams of this particular dye.

Preparation

Preparation of the source material involves only selection of suitable specimens and enough drying to eliminate sensible moisture on the surfaces which are to receive the integument. Any commercial flower raiser finds it necessary to raise enough plants to have a fair margin of safety with respect to fluctuations in demand, and as a result throws away substantial numbers of finished flowers at the peak of their beauty. Because processing according to the invention transforms such perishable and unsalable goods into permanent articles of maximum beauty, that will remain substantially unimpaired in appearance for a matter of years, these otherwise completely worthless by-products become a material source of revenue.

Application

The prepared specimens, themselves at room temperature or below, are quickly subjected to a brief application of integument material. When a quiescent bath is used, the mass of integument is kept just warm enough so that no skin forms on the top surface exposed to the ambient room temperature, and the entire specimen to be overcast is quickly but gently plunged into the molten mass for a second or two and then as quickly lifted up above the molten mass and twirled or shaken gently to dislodge all but a very thin film of solidified integument. Insertion, withdrawal and shaking off excess liquid, need only take about three seconds, about as fast as the hand can operate. Very effective control of thickness is by varying the bath temperature. Maximum thickness results when the bath is as cool as it can be kept without forming a skin on the surface that interferes with manipulation. Raising of the temperature another 5 deg. makes the coating much thinner. If a very thick integument is desired, the plant can be dipped twice.

When the applying instrumentality is flowing stream, the immersed plant can be twisted around in the stream so that somewhat better penetration into deep crevices can be secured. A poured stream can fall on the plant with a little more speed and exert a little more penetrating power. A gentle jet directed upwards can deliver any desired velocity of impact, but because the integument material is moving against gravity, the jet can be made to give the most thorough interpenetration of all, not so much because of the available jet force, but because gravity will assist the operator in presenting the plant with its individual petals, bracts and leaves fanned to open up the crotches between them.

No one of these procedures will always secure a perfect seal at the bottom of every individual crotch and crevice of the plant, but nearly all the crotches are completely sealed, and the remaining crotches are all nearly sealed. Experience has shown that access of a liquid according to the invention to the few limited and shielded areas not completely sealed, does not cause deterioration of the finished display for at least a year or so. It is believed this possible cause of aging will not become significant for much longer than that, but at the time of filing this application the invention has not been in use long enough to state that as a proven fact. All surfaces that are exposed to view in any direction can easily be covered, and discoloration of parts that cannot be seen would mean nothing if it did occur.

Because of the low temperature of the bath, stream, or jet, the operator has no need to take any precaution to protect his hand from heat.

Immersion

To immerse the display, the flowers may be enclosed in a hollow, inverted transparent sphere 18. The mounting may include a bottom closure comprising a base having an outer flange 20 for contact with the supporting surface, and a center cup 22. The sphere 18 is formed with a neck 24, and spiral threads 26 may be provided on the neck 24, and at 28 in the cup 22 to enable the user to screw the parts together so that the liner plate 30 is clamped down against the gasket 32. The plate 30 may carry an anchor 34 having serrations 36 to secure a grip on a block of spongy material 38 into which the stems 12 of the flowers may be thrust.

A suitable material for the block is sold on the market under the name Styrofoam. This is a composition of styrene which is usually manufactured by heating aniline, and paraldehyde and hydrochloric acid. The Styrofoam is of a rather fluffy, spongy cork-like appearance, very light in weight, having a low density and has the physical property of capturing and holding the stem of a flower or of a similar plant by merely pressing the stem into the Styrofoam. Some force will be required in order to remove the stem so inserted.

In assembling such a display, the block 38 is fastened in place, and the flowers dipped and mounted on it. Then the sphere is inverted with its neck uppermost and filled with liquid, and the flowers are gently worked in through the neck into the position indicated in Figure 1, while the entirety is inverted. After the parts are fastened together, the display can be placed in the position of Figure 1 and is ready to use. In filling the sphere, care should be taken to leave at least a little air clearance, which will appear at 40 at the top.

The mechanical means for immersion are purchased by me on the open market and are no part of my invention.

The liquid used in the sphere has a material effect on the appearance of the assembly. I prefer to use distilled water combined with a preservative. One preservative that has been found very effective is a one per cent water-white solution of formaldehyde in distilled water. With such a liquid, the fluid retains a nice water-white color, and the surfaces of the treated leaves and petals appear to have about the same flat color, or light-reflecting property, as the natural plant has in air.

Another filling that is equally effective so far as permanency is concerned, is obtained by mixing the water with 1-2-propane diol up to about twelve and one-half per cent. With such a glycol solution, the surfaces of the leaves and petals are highly reflective and glisten quite noticeably, like an oil film. The completed assembly is well protected against injury by freezing. It will be apparent that by the use of the different liquids I am able to suit the tastes of the purchaser by a difference in appearance very similar to that between a glossy photographic print and a flat photographic print.

One of the best preservatives we have used so far is plain sodium bi-sulphite, $NaHSO_3$. A good concentration is four grams to one gallon of water.

Another effective preservative is merthiolate. Used by itself, best results seem to be with 0.016 gram per gallon, but from 0.008 to 0.024 is effective. Merthiolate is a powerful fungicide, but does not have a strong deoxidizing action, whereas sodium bi-sulphite is a strong deoxidizing agent. It is believed optimum results are obtainable with both preservatives present. The quantity used should be sufficient to prevent oxidative attack on the plant tissues and to maintain the germicidal and fungicidal properties of the liquid, with a margin of safety to take care of possible absorption. For instance, with three good sized red roses in a gallon of liquid, approximately as indicated in the drawings, a pint of glycol gives good results, but if the liquid volume is cut in half without reducing the amount of plant material present, it is best not to reduce the glycol material. Pulpy flowers need somewhat more preservative than those where the plant structure is relatively hard and compact.

Similarly, with three good sized red roses in a gallon of liquid, I prefer to use four grams of sodium bi-sulphite and 0.008 gram of merthiolate, or the equivalent in other anti-oxidants, germicides and fungicides, but good results are obtainable when the above quantities are increased or reduced by about fifty per cent.

Others may readily adapt the invention for use under various conditions of service by employing one or more of the novel features involved or equivalents thereof. I have recently discovered that the attractiveness of displays of this type may be greatly enhanced by incorporating a minor fraction of phosphorescent material in the integument. In daylight, or in a lighted room, the presence of a phosphorescent material goes unnoticed, but in the dark the plants are visible and constitute a very beautiful think to look at.

The provisions of a molten bath or jet cool enough to permit the operator to work bare handed is a material advantage, and imposes a top limit of about one hundred thirty degrees F. for the bath temperature. I have found that even when the plant would stand a much higher temperature, materials melting at one hundred thirty degrees F. or below give as good an integument as can be obtained with higher melting mixtures. So far as I know, the most delicate plant structures suitable for processing according to the invention can stand at least one hundred fifteen degrees F. and usually one hundred twenty degrees F.

As at present advised with respect to the apparent scope of my invention, I desire to claim the following subject matter.

This application is a continuation in part of my copending application Serial No. 181,164 filed August 24, 1950.

I claim:

1. A submerged natural plant display comprising: natural plant members with their internal moisture content and cell structure substantially intact; a thin, impermeable, opaque, chemically inert, water-proof coating adhering permanently to the surfaces of said plant members exposed to view and sealing said surfaces; said coating also substantially covering all plant surfaces accessible to liquid enveloping the plant members; a container enclosing all of said members; and a filling of clear transparent liquid in said container and enveloping said members; said liquid being [substantially pure] water and a solute therein adapted to retard deterioration of said members.

2. A display according to claim 1 in which the solute for preventing deterioration is sodium bisulphite up to a concentration of about one part in nine hundred.

3. A display according to claim 1 in which the solute for preventing deterioration is propylene glycol up to about twelve and one-half per cent.

4. A display according to claim 1 in which the solute for preventing deterioration is sodium ethyl mercuri thiosalicylate up to about 0.024 gram per gallon.

5. A display according to claim 4 in which the solute includes also sodium bisulphite up to about one part in nine hundred.

6. A display according to claim 1 in which said coating is colored and certain of said members have coating of a color differing from that of said other members.

7. A display according to claim 1 in which said coating is of paraffin blended with mineral oil.

8. A submerged natural plant display comprising: natural plant members with their internal moisture content and cell structure substantially intact; a thin, impermeable, opaque, chemically inert, water-proof coating adhering permanently to the surfaces of said plant members exposed to view and sealing said surfaces; said coating also substantially covering all plant surfaces accessible to liquid enveloping the plant members; a container enclosing all of said members; and a filling of clear transparent [substantially pure] water in said container and enveloping said members.

*9. A submerged natural plant display comprising: natural plant members with their internal moisture content and cell structure substantially intact and unaltered; a thin, impermeable, chemically inert, water-proof coating adhering permanently to the surfaces of said plant members and substantially covering and sealing all plant surfaces accessible to liquid enveloping the plant members; said coating being colored to mask by its own color the plant surfaces so covered; a transparent container enclosing all of said members; and a filling of clear, transparent liquid in said container and enveloping said members; said liquid being water containing a solute therein adapted to retard deterioration of said members.*

*10. A submerged natural flower display comprising: a natural flower with its internal moisture content and cell structure substantially intact and unaltered; a flexible, solidified, chemically inert, water-proof coating adhering permanently to the surfaces of said flower and substantially covering and sealing all surfaces of said flower accessible to liquid enveloping said flower; said coating having a depth of color such as to render said coating opaque and thereby mask the underlying color of said flower; a transparent container enclosing said flower; and a filling of clear transparent liquid in said container and enveloping said flower, said liquid being water containing a solute therein adapted to retard deterioration of said flower.*

*11. A display according to claim 10, in which said coating is of paraffin blended with mineral oil.*

CLARENCE E. BUSSERT.

REFERENCES CITED

The following references are of record in the file of this patent or the original patent:

UNITED STATES PATENTS

| Number | Name | Date |
|---|---|---|
| 1,450,408 | Brooks | Apr. 3, 1923 |
| 1,788,058 | Jyumie | Jan. 6, 1931 |
| 1,935,706 | Joffe | Nov. 21, 1933 |
| 2,057,413 | Bridgeman | Oct. 13, 1936 |
| 2,105,688 | Fessenden | Jan. 18, 1938 |
| 2,174,771 | Bender | Oct. 3, 1939 |
| 2,226,951 | Simpson | Dec. 31, 1940 |

FOREIGN PATENTS

| Number | Country | Date |
|---|---|---|
| 984,757 | France | Feb. 28, 1951 |